United States Patent [19]
Carrell

[11] Patent Number: 4,648,588
[45] Date of Patent: Mar. 10, 1987

[54] ARTICULATED MANIPULATION DEVICE
[75] Inventor: Ross M. Carrell, Burlington, N.J.
[73] Assignee: RCA Corporation, Princeton, N.J.
[21] Appl. No.: 743,827
[22] Filed: Jun. 12, 1985
[51] Int. Cl.$^4$ .............................................. B65H 3/08
[52] U.S. Cl. ...................................... 271/91; 271/108; 901/40
[58] Field of Search .................. 271/90, 91, 92, 93, 271/94, 95, 96, 97, 98, 20, 112, 111, 108; 901/40

[56] References Cited
U.S. PATENT DOCUMENTS

| | | | |
|---|---|---|---|
| 1,920,388 | 8/1933 | Harrold | 271/93 X |
| 3,617,048 | 11/1971 | Albert | 271/26 |
| 3,837,638 | 9/1974 | Anderson et al. | 271/98 X |
| 4,146,217 | 3/1979 | Barker | 271/108 |
| 4,436,298 | 3/1964 | Donner et al. | 271/111 X |
| 4,437,657 | 3/1984 | Selak | 271/108 X |
| 4,513,957 | 4/1985 | Schaefer, Jr. | 271/90 |

FOREIGN PATENT DOCUMENTS
1177652  9/1964  Fed. Rep. of Germany .... 271/26 R

Primary Examiner—Richard A. Schacher
Attorney, Agent, or Firm—Joseph S. Tripoli; Robert L. Troike; Raymond E. Smiley

[57] ABSTRACT

An articulated vacuum arrangement. A plurality of vacuum fingers are pivotably coupled to a base member, each vacuum finger comprising an arm extending from the point of pivot to an orifice to the atmosphere, each arm defining an air passage channel. The base member includes, for each vacuum pad, an orifice. An airtight structure connects between each base member orifice and its associated vacuum pad arm. A structure is included for creating at selected ones of the vacuum fingers a reduced pressure relative to atmospheric pressure.

12 Claims, 7 Drawing Figures

ARTICULATED MANIPULATION DEVICE

BACKGROUND OF INVENTION

1. Field of Invention

This invention is concerned with means adaptable for singulating items from a stack of items and, more particularly, is concerned with vacuum pads and fingers for picking up and/or moving non-planar items in a generally horizontal plane.

2. Discussion of Prior Art

It is known to use vacuum pads to lift thin, flat, planar objects off a stack. It is also known to use fingers to push items of appreciable thickness off a stack. In the handling of mail, both thick and thin items of various sizes may be intermixed in a stack, so that the surface of the stack may be uneven and not horizontal. A simple vacuum pad or pushing device would not operate reliably under these circumstances.

SUMMARY OF THE INVENTION

An articulated vacuum pad assembly comprises in combination a base member having a plurality of orifices, a plurality of vacuum fingers, each comprising an elongated arm. One end of each arm has an orifice open to the atmosphere and the other end of each arm is pivotably attached to the base member. Each arm has a passageway extending from the orifice in the vacuum finger to the other end. An airtight means for connecting between the passageway at the other end to an associated orifice in the base member is provided. A means is coupled to the base member for creating reduced pressure relative to atmospheric pressure at selected ones of the vacuum finger orifices.

DETAILED DESCRIPTION OF THE PREFERRED EMBODIMENT

Figure 2:
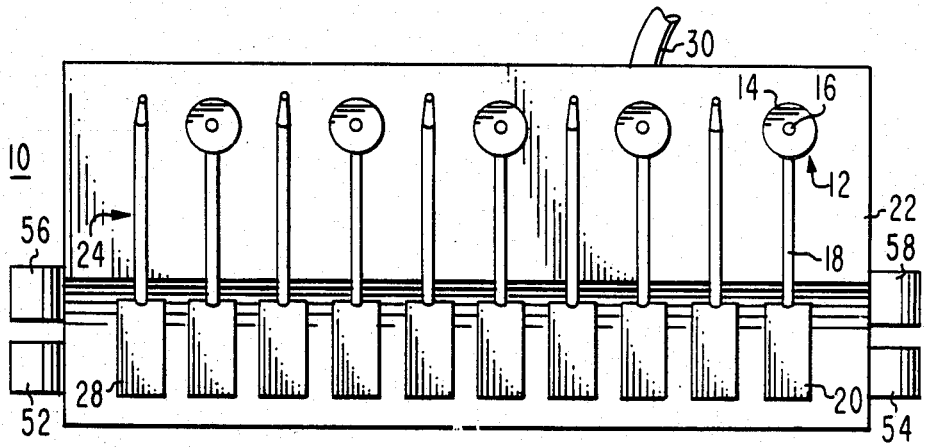
FIG. 2 is a bottom plan view of the articulated vacuum pad assembly.

Referring first to FIG. 2, which illustrates the underside of an articulated vacuum pad assembly 10, there are a plurality of individual vacuum fingers 12, five being shown by way of example. An individual vacuum finger 12 is illustrated better in FIG. 3. An individual vacuum finger 12 consists of a circular, flexible seal portion 14, having an orifice 16 attached to hollow arm 18. Hollow arm 18 connects between seal 14 and a bellows 20 which is, in turn, attached to base member 22. The attachment of the arm 18, bellows 20 and base member 22 is such that the arm pivots about base member 22, as indicated by double-ended arrow 96, at the point of attachment 20a with bellows 20. As best illustrated in FIG. 2, the individual vacuum fingers 12 are parallel to one another, in line with one another and interleaved with a plurality of pulling fingers 24. The shape of the pulling fingers is best illustrated in FIG. 4. A pulling finger 24 comprises a solid, rigid finger 26 attached to a bellows 28. Bellows 28 is, in turn, attached to base member 22. As with vacuum arms 18, the rigid fingers 26 are effectively pivotably coupled to base member 22 at the point of attachment 28a with bellows 28. The solid line indicated by 26 and dashed line indicated by 106 mark the extreme positions of finger 26. Double-ended arrow 97 indicates the pivotable nature arm 26.

Base member 22 includes numerous passageways and orifices which will be discussed hereinafter in a more detailed description of FIGS. 3 and 4. It will be sufficient now to say that an air passageway leads from tubing material 30 to each of the bellows 20 and 28. A further passageway extends through tube 18 to orifice 16 on each of the individual vacuum pads.

Figure 1:
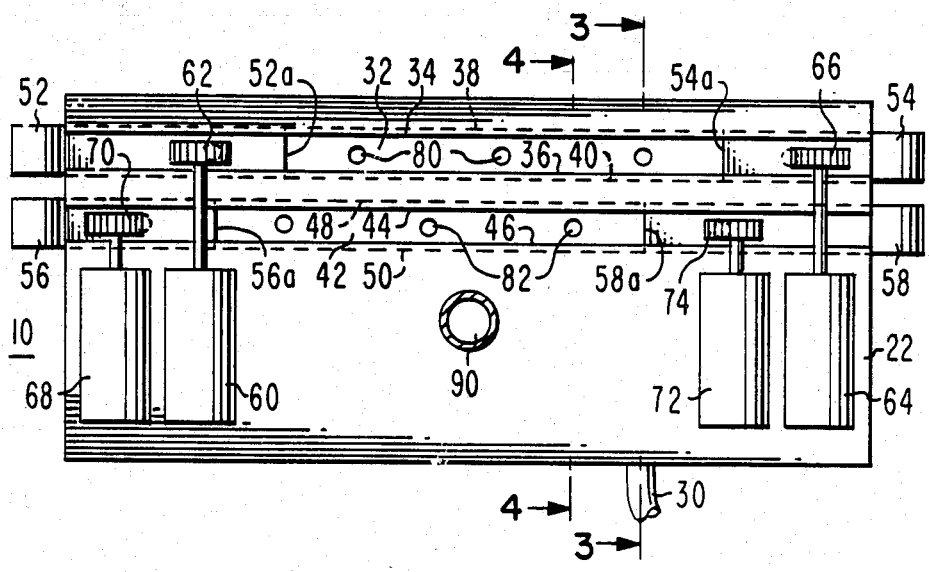
FIG. 1 is a top plan view of an articulated vacuum pad assembly in accordance with a preferred embodiment of the present invention.

Referring now to FIG. 1, which is a top plan view of articulated vacuum pad assembly 10, there are two recessed tracks running the width of base member 22. The first track 32 is defined by lines (walls) 34 and by 36 and by hidden lines (walls) 38 and 40. The second track 42 is defined by lines 44 and 46 and by hidden lines (walls) 48 and 50. The shape of the tracks is best illustrated in FIG. 3.

Referring again to FIG. 1, located along the tracks and extending beyond the edge of base member 22 are four coil springs 50 and 52, located in track 32, and 54 and 56 located in track 42. A particularly useful type coil spring is the Negator brand spring which has the useful property of constant force as the spring winds or unwinds. The coil springs are driven back and forth along their respective tracks by appropriate motors. Thus, motor drive means 60 and, more particularly, toothed wheel 62 thereof controls the movement of coil spring 52. Drive means 64 and, more particularly, toothed wheel 66 controls the movement of coil spring 54. Drive means 68 and, more particularly, toothed wheel 70 thereof controls the movement of coil spring 56. Drive means 72 and, more particularly, toothed wheel 74 thereof controls the motion of coil spring 58.

Located along track 32 are a plurality of orifices 80, five such orifices being illustrated in FIG. 1 (two of the five are illustrated in phantom). The orifices connect through passageways to orifices 16 (FIG. 2) in individual vacuum pads 12. A second plurality of orifices 82, there also being five illustrated in FIG. 1 (two of the five are shown in phantom), are connected through passageways to be described hereinafter to associated bellows 28 (FIG. 2). The various orifices illustrated in phantom are covered by uncoiled portions of coil springs. The ends of coil springs 52 and 54 are marked by lines 52a and 54a respectively. Similarly, lines 56a and 58a mark the termination of uncoiled portions of coil springs 56 and 58 respectively. The circular element 90 illustrated in cross-section leads to a device for holding assembly 10, as will be described in more detail in connection with FIG. 6.

Figure 3:
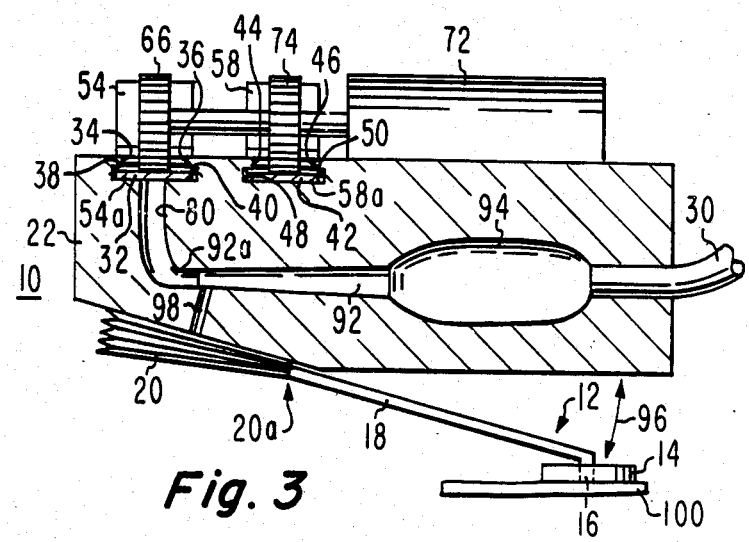
FIG. 3 is an elevational cross-section view of the articulated vacuum pad assembly along lines 3—3 of FIG. 1.
Figure 4:
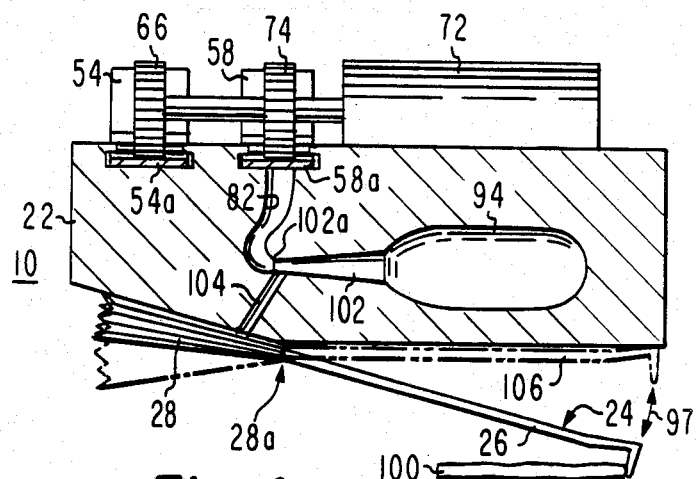
FIG. 4 is an elevational cross-section view of the articulated vacuum pad assembly along lines 4—4 of FIG. 1.

With respect to FIG. 3, which is a cross-section along lines 3—3 of FIG. 1, one of the plurality of internal passageways is illustrated. Passageway 92 formed by the walls of base member 22 leads from an orifice 80 to a common plenum 94, also formed by walls of base member 22. Plenum 94 connects to all passageways 92 and also connects to a source (not shown) of elevated pressure, relative to atmospheric pressure, via tubing 30.

An orifice 98 connects between each passageway 92 and each bellows 20. The orifice 98 connects with passageway 92 at a restricted portion 92a thereof. The restricted portion 92a forms a venturi for creating reduced pressure relative to atmospheric pressure in bellows 20 and at orifice 16.

Briefly, the operation of that portion of the articulated vacuum pad shown in FIG. 3 is as follows. It will be assumed that orifice 80 is open to the atmosphere. That is, it is not covered by coil spring 54 nor coil spring 52. With positive pressure applied to tube 30 and, therefore, plenum 94, there is movement of air from plenum 94 to orifice 80 and thence to the atmosphere. Because of the reduced restricted portion of the passageway at 92a and, therefore, a consequent speed-up of airflow through that area, a reduced air pressure relative to the atmospheric pressure (vacuum) is created in orifice 98. This vacuum causes air to flow through hollow tube 18, which is of a small cross-sectional area so that there will be a pressure drop between orifice 16, which is initially open to the atmosphere, and the bellows 20. The exposed surfaces of bellows 20 will experience net inward pressure, causing the bellows to collapse and moving the flexible seal 14 toward the target surface 100. When contact is made, the flow of air into orifice 16 and through hollow tube 18 is cut off, and the full effect of the vacuum created by venturi 92a acts to further collapse bellows 20, pressing flexible seal 14 against the surface 100. Thus, once a finger contacts a surface, the action of the vacuum is to press it firmly in place.

If it is next assumed that a coil spring 54 or 52 is covering the particular orifice 80 illustrated in FIG. 3, air pressure via tubing 30 and plenum is directed through orifice 98 through bellows 20 and tube 18 to orifice 16 where it is discharged. Now the bellows 20 experiences a net positive pressure and expands, moving hollow tube 18 to an upper position. The air flowing from orifice 16 will tend to push away any nearby item.

FIG. 4 is similar to FIG. 3, but is a cross-section along lines 4—4 of FIG. 1. A plurality of passageways 102 equal in number to the number of orifices 82 (FIG. 1) extend between the common plenum 94 and each orifice 82, there being one such passageway 102 illustrated in FIG. 4.

Operation of what is illustrated in FIG. 4 is similar to the operation of FIG. 3, except that no opening leads from bellows 28 along picker finger 26. The particular bellows 28 illustrated in FIG. 4 shown in its compressed position (the one shown in solid line) is compressed due to the fact that coil spring 58 is positioned such that the particular orifice 82 illustrated in FIG. 4 is uncovered. Had the cross-section view of FIG. 4 been taken at a different location in FIG. 1, at a location where a particular orifice 82 was covered by either coil spring 56 or 58, that particular bellows 28 would be in its expanded position and finger arm 26 would be raised as illustrated in the dash line 106 in FIG. 4.

Figure 5:
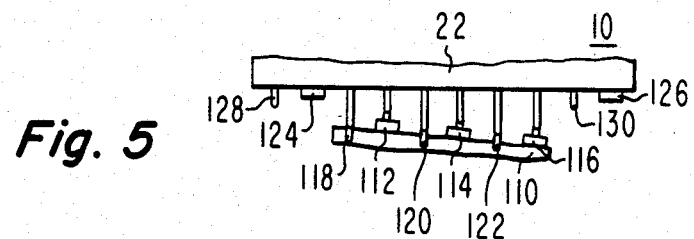
FIG. 5 is a view illustrating how the articulated vacuum pad assembly of FIG. 1 operates in conjunction with a non-planar item for the lifting or pulling thereof.

FIG. 5 is an elevational view of the articulated vacuum pad assembly 10 shown with an item 110 to be lifted thereby. Many of the details of the vacuum pad assembly are missing from FIG. 5 as being unnecessary to show the principle involved therein. In particular three individual vacuum pads 112, 114 and 116 are shown in contact with item 110. Additionally, three picker fingers 118, 120 and 122 are positioned over the edge of item 110. Two other individual vacuum pads 124 and 126 are not needed because they fall on either side of item 110 and, due to pressure on their associated bellows (because of the placement of coil springs 52 and 54 over the openings 80 illustrated in phantom in FIG. 1), are retracted against the undersurface of the base member 22 of vacuum pad assembly 10. Similarly, two unused fingers 128 and 130 (FIG. 5) are also retracted against the underside of base member 22 (because of the placement of coil springs 56 and 58 over the opening 82 illustrated in phantom in FIG. 1). Although the article 110 is shown centered in FIG. 5, in reality, it may be off to one side.

It will be noted that the various vacuum pads 112, 114, 116 are at different elevational positions relative to base member 22 to thus conform with the shape of item 110. Because each vacuum pad is pivotable, the conformity to the shape of an item to be lifted is possible. The reason that item 110 is not parallel to the base of member 22 may be due to any number of reasons, one being that item 110 is on a stack of various size items (not shown) which cause it to be non-flat.

Figure 6:
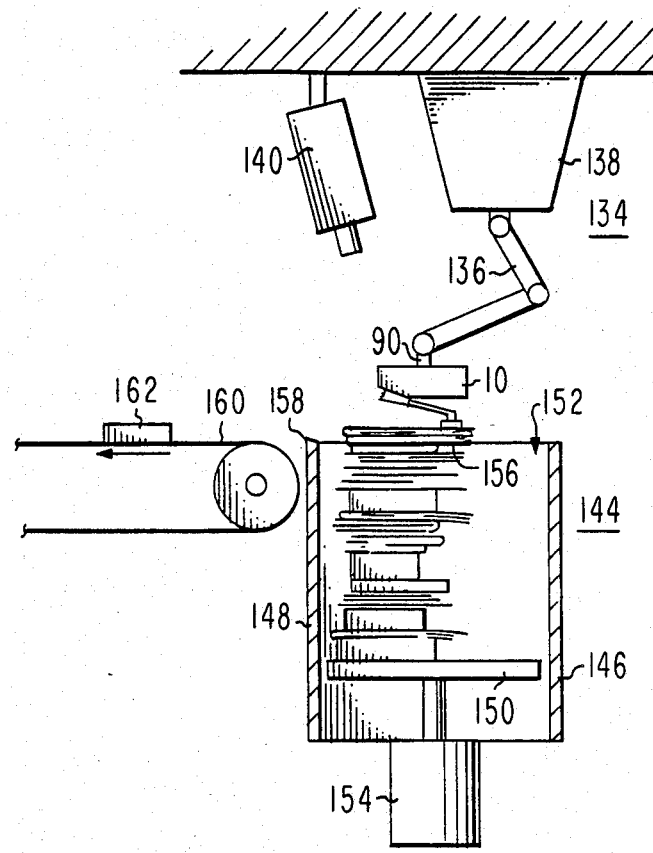
FIG. 6 is a mail singulation system utilizing the articulated vacuum pad assembly of FIG. 1.

FIG. 6 illustrates an articulated vacuum pad assembly 10 utilized in a mail singulation system. The mail singulation system includes a robot 134 of conventional design which, in turn, includes an articulated arm 136, at the end of which is located articulated vacuum pad assembly 10. The robot base 138 and a camera 140 are mounted from suspended platform 142 over a mail bin 144 illustrated in cross-section. Mail bin 144 may take the form of a rectangular container comprising sidewalls 146 and 148 (the end walls are not illustrated for drawing clarity) and a raisable floor 150. Mailpieces 152 of various sizes, weights and shapes are stacked (by means not shown) into bin 144. A raising mechanism 154 attached to bin floor 150 causes the mailpieces 152 to be raised such that the top mailpiece 156 is always generally level with top surface 158 of bin 144. A take away conveyor 160 is positioned relative to bin 144 such that mail removed from bin 144 (mailpiece 162 being exemplary) can be easily moved from bin 144 to the conveyor to be taken away thereby. The purpose of camera 140 is to scan mailpiece such as 86 to determine its dimension along the length dimension of vacuum pad assembly 10.

Figure 7:
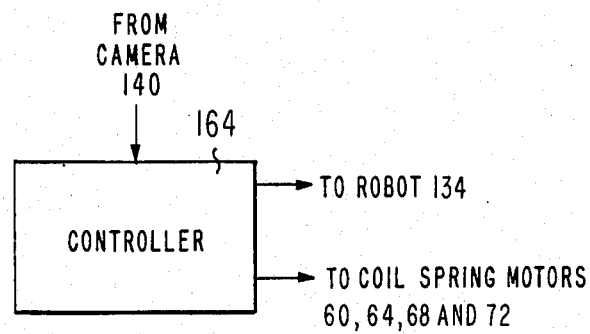
FIG. 7 illustrates the electrical interconnection of the singulation system of FIG. 6.

FIG. 7, to which attention is now directed, illustrates the electrical interconnection among the various parts. A controller 166 receives signals from camera 140, the signal being indicative of a dimension of each top mailpiece such as 156 (FIG. 6) and its location laterally to articulated vacuum pad assembly 10. The received signals are translated as necessary and transmitted to coil spring motors 64, 68 and 72 to position coil springs 52, 54, 56 and 58 respectively such that the space between the ends 52a and 54a and the space between the ends of 56a and 58a respectively are of approximately the same dimensions as the particular mailpiece 156, which is at the top of the stack of mailpiece 152 (FIG. 6). Furthermore, the specific orifices 98 and 104 (FIGS. 3 and 4 respectively), which are at a reduced pressure, correspond to the lateral location of mailpiece 156 along pad assembly 10 (left-to-right in FIG. 5.) Controller 164 is also coupled to robot 134 to provide signals thereto to direct the motion of vacuum pad assembly 10 to mailpiece 156, once the proper relationships of the vacuum-controlling springs 52, 54, 56 and 58 are established. Then vacuum pad assembly 10 is moved by robot arm 136 to pick up mailpiece 156 and transport it to take away conveyor 160. It will be understood that, although the particular signals transmitted between controller 164 and robot 134 are complex, these are well known and will not be described in detail, since those particular instructions are not part of the present invention.

Operation of the mail singulation system, including operation of vacuum pad assembly 10, is as follows. Raising mechanism 154 (FIG. 6) moves floor 150 of mail bin 144 up such that the top mailpiece 156 is level with the top surface 158 of mail bin 144. This may be accomplished by means (not shown) for determining when the top piece of mail rises just above the top surface of lip 158. Then camera 140 determines the width of that mailpiece 156 and sends a signal corresponding thereto to controller 164. Controller 164 sends signals to two or all four of motors 60 and 68 and/or 64 and 72 to move coil springs 52 and 56 and/or 54 and 58 respectively to uncover such orifices 80 and 82, which correspond with the width of mailpiece 156. As mentioned previously in connection with operation of vacuum pad assembly 10 when an orifice 80 or 82 is not sealed off by a coil spring, air coming from a pressure source (not illustrated) creates a venturi effect in region 92a (FIG. 3) or 102a (FIG. 4) associated with a particular orifice 80 or 82, which is not covered by a coil spring. When a particular orifice 80 or 82 is covered by a coil spring, air pressure at plenum 94 is forced out of orifice 98, thereby creating, not a vacuum at the associated individual pad 14, but rather a positive pressure. Once the various coil springs are positioned to provide a vacuum at orifices corresponding in number to the size of mailpiece 156, a signal is sent to robot 134 causing it to direct vacuum pad assembly 10 to the mailpiece 156 to lift that piece of mail and to move it to conveyor 160 where it is carried away. Then floor 150 is again raised so that the next piece of mail is in line with surface 158 of the mail bin and the process above described repeats.

With regard to vacuum pad assembly 10, it should be understood that base member 22 does not have orifices in any particular shape, but rather they are located, given the nature of the items to be picked up, by vacuum pad assembly 10. Thus, for example, orifices 80 could be in two or more rows. A similar statement could be made about orifices 82.

It should be understood that the operation of the vacuum fingers 12 and the puller fingers are independent of each other and are wholly under the control of controller 164, which may be programmed to operate the robot and the vacuum pad assembly in varying ways in response to the character and position of successive items at the top of the stack.

For example, a small envelope can be directly lifted by a few of the vacuum fingers. A larger envelope may be too large to lift; the fingers can be applied to bthe edge nearest to lip 158, and the envelope pulled across it. Magazines, which would be pulled apart by a vacuum lift, can be dragged by placing the vacuum pad assembly 10 so that the puller fingers 24 will fall along the rear edge of the magazine, and the vacuum fingers 18 compress the paper stack; now the magazine will move as a whole in manner illustrated in FIG. 6.

What is claimed is:

1. An articulated manipulation device comprising in combination:
   a base member having a plurality of spaced apart orifices;
   a plurality of vacuum fingers, each comprising an elongated arm, one end of each arm having an orifice open to the atmosphere, the other end of each arm being individually pivotably coupled to said base member, each arm having a passageway extending from said orifice to said other end;
   means providing an airtight connection between said passageway at said other end and an associated orifice in said base member; and
   means coupled to said base member for creating reduced pressure relative to atmospheric pressure at selected ones of said orifices.

2. An articulated manipulation device comprising in combination:
   a base member having a plurality of spaced apart orifices;
   a plurality of vacuum fingers, each comprising an elongated arm, one end of each arm having an orifice open to the atmosphere, the other end of each arm being individually pivotably coupled to said base member, each arm having a passageway extending from said orifice to said other end;
   means providing an airtight connection between said passageway at said other end and an associated orifice in said base member, comprising a bellows having an opening to said passageway and an opening to said associated orifices in said base member; and
   means coupled to said base member for creating reduced pressure relative to atmospheric pressure at selected ones of said orifices.

3. The combination as set forth in claim 2 further including means for creating elevated pressure relative to atmospheric pressure at those ones of the plurality of vacuum finger orifices which are not said selected ones.

4. The combination as set forth in claim 3 wherein each said bellows is attached to its respective vaccum finger arm for pivoting said arm relative to said base member into a first or second position depending on whether reduced or elevated pressure is present at said vacuum finger orifice.

5. The combination as set forth in claim 3 wherein for each of said spaced apart orifices there is a connecting passageway to an orifice to the atmosphere and wherein said means for creating elevated pressure comprises means for covering said orifice to said atmosphere.

6. The combination as set forth in claim 5 wherein said means for normally creating said reduced pressure comprises a venturi in said passageway to said atmosphere in the vicinity of each of said spaced apart orifices.

7. The combination as set forth in claim 3 wherein said orifices to the atmosphere are in line and N in number and wherein said means for covering each of said orifices to the atmosphere comprises first and second means, said first means covering a number $Y=0$ to $N-1$ in number starting from one end of said line, said second means covering $X=0$ to $(N-1-Y)$ in number of said orifices to atmosphere.

8. The combination as set forth in claim 2 further including a plurality of finger-like elements, each finger-like element individually pivotably coupled at one end thereof to said base member, pivotal between a first position relatively close to said base member and a second position relatively removed from said base member, said base member having a second plurality of orifices connected to said means for creating reduced pressure and further including a plurality of means coupled between respective ones of said second plurality of orifices and second finger-like elements for moving selected ones of said fingler-like elements from said first position to said second position.

9. The combination as set forth in claim 8 wherein for each finger-like element said means for moving selected ones of said finger-like elements comprises a bellows having an opening to an associated orifice of said second plurality of orifices in said base member.

10. The combination as set forth in claim 9 further including means for creating elevated pressure relative to atmospheric pressure of those ones of the finger-like element associated bellows which are associated with those finger-like elements which are non-selected.

11. An item singulation system for singulating items of unlike size from a stack of items, comprising in combination:
   a base member having a plurality of orifices;
   a plurality of vacuum fingers each comprising an elongated arm, one end of each arm having an orifice open to the atmosphere, the other end of each arm being pivotably attached to said base member;
   means for determining the size and position laterally of the item of said stack of items nearest said pads;
   means for creating a reduced pressure relative to atmospheric pressure at those vacuum finger orifices of said plurality which correspond to the size and position of said nearest item and for creating an elevated pressure relative to atmospheric pressure at the others of said orifices; and
   means for moving said base member and vacuum pads to a position of contact with said nearest item and then for moving said nearest item away from the stack of items.

12. The combination as set forth in claim 11 wherein for each of said orifices in said base member there is a connection passageway to an orifice to the atmosphere and wherein said means for creating elevated pressure comprises means for covering said orifice to said atmosphere for creating elevated pressure.

* * * * *